United States Patent
Geml et al.

(10) Patent No.: US 10,254,985 B2
(45) Date of Patent: Apr. 9, 2019

(54) POWER MANAGEMENT OF STORAGE DEVICES

(71) Applicant: Western Digital Technologies, Inc., Irvine, CA (US)

(72) Inventors: Adam Christopher Geml, Rochester, MN (US); Colin Christopher McCambridge, Rochester, MN (US); Philip James Sanders, Rochester, MN (US); Lee Anton Sendelbach, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 30 days.

(21) Appl. No.: 15/071,038

(22) Filed: Mar. 15, 2016

(65) Prior Publication Data

US 2017/0269860 A1 Sep. 21, 2017

(51) Int. Cl.
*G06F 3/06* (2006.01)
*G06F 1/32* (2019.01)
*G06F 1/26* (2006.01)

(52) U.S. Cl.
CPC .......... *G06F 3/0625* (2013.01); *G06F 3/0634* (2013.01); *G06F 3/0653* (2013.01); *G06F 3/0688* (2013.01); *G06F 3/0689* (2013.01); *G06F 1/26* (2013.01); *G06F 1/32* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 7,152,142 B1* | 12/2006 | Guha | G06F 3/0625 |
| | | | 711/114 |
| 8,276,003 B2 | 9/2012 | Andresen et al. | |
| 8,862,807 B2 | 10/2014 | Yoon et al. | |
| 9,021,282 B2 | 4/2015 | Muller | |
| 2005/0144486 A1 | 6/2005 | Komarla et al. | |
| 2005/0210304 A1* | 9/2005 | Hartung | G06F 1/3268 |
| | | | 713/320 |
| 2006/0053338 A1* | 3/2006 | Cousins | G06F 11/008 |
| | | | 714/6.12 |
| 2009/0316541 A1* | 12/2009 | Takada | G06F 1/3221 |
| | | | 369/47.5 |
| 2010/0332871 A1* | 12/2010 | Allalouf | G06F 9/5027 |
| | | | 713/320 |

(Continued)

OTHER PUBLICATIONS

Adaptec by PMC, "Adaptec Intelligent Power Management" Retrieved from https://www.adaptec.com/nr/pdfs/powermanagementwhitepaper.pdf, 2011, 4 pgs. "Applicant points out, in accordance with MPEP 609.04(a), that the year of publication, 2011, is sufficiently earlier than the effective U.S. filing date, Mar. 15, 2016, so that the particular month of publication is not in issue."

*Primary Examiner* — Phil K Nguyen
(74) *Attorney, Agent, or Firm* — Patterson & Sheridan, LLP; Steven Versteeg

(57) ABSTRACT

A method includes obtaining power and performance data for each storage device of a plurality of storage devices, and adjusting, based on the power and performance data for the plurality of storage devices, a power consumption level of a particular storage device of the plurality of storage devices.

19 Claims, 5 Drawing Sheets

(56) References Cited

U.S. PATENT DOCUMENTS

| | | | |
|---|---|---|---|
| 2011/0029787 A1* | 2/2011 | Day | G06F 1/266 |
| | | | 713/300 |
| 2011/0208911 A1* | 8/2011 | Taguchi | G06F 1/3221 |
| | | | 711/114 |
| 2013/0097433 A1 | 4/2013 | Boorman et al. | |
| 2013/0312005 A1 | 11/2013 | Chiu et al. | |
| 2015/0106644 A1* | 4/2015 | Lin | G06F 11/3062 |
| | | | 713/340 |
| 2015/0169021 A1 | 6/2015 | Salessi et al. | |
| 2017/0060208 A1* | 3/2017 | Sawai | G06F 1/3268 |
| 2017/0139754 A1* | 5/2017 | Moreno | G06F 9/5044 |

* cited by examiner

POWER MANAGEMENT OF STORAGE DEVICES

TECHNICAL FIELD

This disclosure relates to power management, and more particularly, to adjusting a power consumption level of a storage device.

BACKGROUND

Memory devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications. For instance, non-volatile memory devices, including flash memory devices, are commonly incorporated into solid-state storage devices, such as solid-state drives (SSDs).

SUMMARY

In one example, a method includes obtaining power and performance data for each storage device of a plurality of storage devices, and adjusting, based on the power and performance data for the plurality of storage devices, a power consumption level of a particular storage device of the plurality of storage devices.

In another example, a host system includes one or more processors configured to: obtain power and performance data for each storage device of a plurality of storage devices controlled by the host system; and adjust, based on the power and performance data for the plurality of storage devices, a power consumption level of a particular storage device of the plurality of storage devices.

In another example, a storage device includes a controller configured to: obtain power and performance data for each storage device of a plurality of storage devices that includes the storage device; and adjust, based on the power and performance data for the plurality of storage devices, a power consumption level of a particular storage device of the plurality of storage devices.

The details of one or more examples are set forth in the accompanying drawings and the description below. Other features, objects, and advantages will be apparent from the description and drawings, and from the claims.

DETAILED DESCRIPTION

Figure 1:
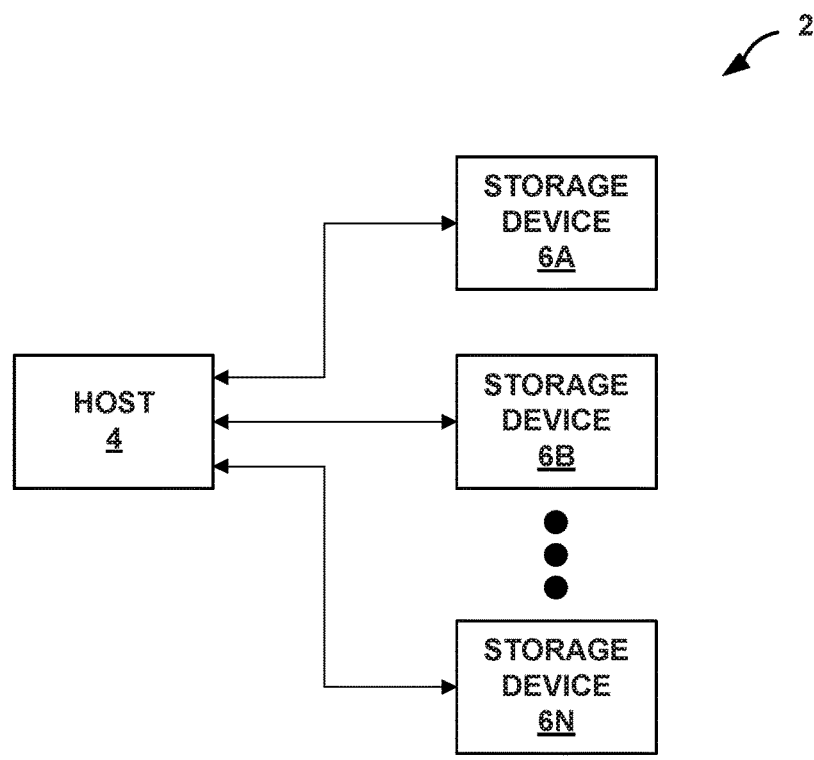
FIG. 1 is a conceptual and schematic block diagram illustrating an example storage environment in which a storage device may function as a storage device for a host system, in accordance with one or more techniques of this disclosure

This disclosure describes techniques for adjusting power consumption levels of a particular storage device based on power and performance data of a plurality of storage devices. Storage devices consume power when reading data, when writing data, and when idling. The level of power consumption of a storage device can be influenced by a wide variety of factors, such as the age of the storage device, manufacturing differences, usage history, and tasks being performed. Additionally, similar storage devices (i.e., that are the same model) can exhibit differing levels of power consumption even under identical circumstances.

In operation, the amount of power that a storage device may consume may be governed by one or more factors such as the total amount of power available to the storage device (i.e., from a power supply), a power consumption target that indicates the amount of power that a storage device may consume, or the like. In some examples, the power consumption target may be set lower than the total amount of power available to the storage device. For instance, if the total amount of power available to the storage device is 25 watts (W), the power consumption target may be set at 20 W.

The performance of a storage device may be the amount of data that can be written to and read from the storage device per unit time. In some examples, the performance of a storage device may be measured by the number of input/output operations per second (IOPS). If some storage devices of a plurality of storage devices in a storage environment have unusually high or low performance levels, the operation of the storage environment may be negatively impacted. As such, in some examples, it may be desirable for storage devices in a storage environment to operate at similar performance levels. For instance, when a plurality of storage devices are operating in a redundant array of independent disks (RAID) configuration, it may be desirable for the plurality of storage devices to operate at similar performance levels (e.g., so the plurality of storage devices remain synchronized).

The overall efficiency of a storage device may be considered to be the ratio between the performance and the power consumption of the storage device. For example, the overall efficiency of a storage device may be measured by the number of IOPS performed per watt (W) of power consumed.

As discussed above, the power consumption of storage devices may be influenced by a wide variety of factors and may change over time. As a result, the respective efficiencies of each storage device of a plurality of storage devices may not be initially uniform and/or may not uniformly change over time such that the efficiency of a particular storage device of the plurality of storage devices may be different from the efficiencies of the other storage devices of the plurality of storage devices. For example, at a given time, a first storage device of a plurality of storage devices may be able to perform 20 k IOPS/W, a second storage device of the plurality of storage devices may be able to perform 21 k IOPS/W, a third storage device of the plurality of storage devices may be able to perform 25 k IOPS/W, and a fourth storage device of the plurality of storage devices may be able to perform 20 k IOPS/W. In situations in which the plurality of storage devices is operating in a RAID configuration, the increased efficiency of the third storage device may cause the RAID to become unsynchronized, which may be undesirable. Alternatively, in situations where the storage environment allows for traffic to be separately allocated amongst the plurality of storage devices and the power consumption target of the third storage device is less than the total amount of power available to the third storage device, the increased efficiency of the third storage device may present a missed opportunity to increase the overall throughput of the storage environment, which may be undesirable.

In accordance with one or more techniques of this disclosure, a device may adjust a power consumption level of a particular storage device of a plurality of storage devices based on power and performance data for the plurality of storage devices. As one example, where the plurality of storage devices are in a RAID configuration, the device may determine whether respective performance levels of the plurality of storage devices are within a performance level envelope based on power and performance data for each storage device of the plurality of storage devices, and adjust the power consumption level of the particular storage device in response to determining that the respective performance level of the particular storage device is not within the performance level envelope. In this way, the device may improve the stability of the storage environment (i.e., by improving the synchronization of the plurality of storage devices).

As another example, where the storage environment allows for traffic to be separately allocated amongst the plurality of storage devices, the device may determine a respective performance to power ratio for each respective storage device based on the power and performance data for the plurality of storage devices, and increase the power consumption level and workload of a particular storage device of the plurality of storage devices that has the greatest respective performance to power ratio and a power consumption target that is less than a total amount of power available to the particular storage device. By increasing the power consumption level of the particular storage device, the device may enable the performance of the particular storage device may be increased, which may allow the particular storage device to handle the increased workload. In this way, the device may increase the overall throughput of the storage environment (i.e., by increasing the total workload able to be handled by the plurality of storage devices).

FIG. 1 is a conceptual and schematic block diagram illustrating an example storage environment 2 in which storage devices 6A-6N (collectively, "storage devices 6") may function as a storage device for host system 4, in accordance with one or more techniques of this disclosure. For instance, host system 4 may utilize memory devices included in storage devices 6 to store and retrieve data.

Storage environment 2 may include host system 4 which may store and/or retrieve data to and/or from one or more storage devices, such as storage device 6. As illustrated in FIG. 1, host system 4 may communicate with storage device 6 via interface 14. Host system 4 may comprise any of a wide range of devices, including computer servers, computer cards or controllers (e.g., peripheral component interconnect (PCI) cards or controllers, PCI-Express cards or controllers, or the like), i/o drawers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Host system 4 may include one or more processors, such as one or more microprocessors, one or more digital signal processors (DSP), one or more application specific integrated circuits (ASIC), one or more field programmable gate arrays (FPGA), and/or other digital logic circuitry. In some examples, the one or more processors included in host system 4 may include one or more central processing units (CPUs), and/or one or more controllers. Some example controllers that may be included in host system 4 include, but are not necessarily limited to, root controllers, driver controllers, RAID cards, host-bus controllers, and i/o drawer controllers.

In some examples, storage environment 2 may include storage devices 6. Storage devices 6 may comprise any of a wide range of storage devices, including one or more hard disk drives (HDDs), one or more solid state drives (SSDs), one or more tape drives, or one or more of any other type of data storage device. In some examples, storages devices 6 may be configured as a redundant array of inexpensive/independent disks (RAID) that collectively function as a mass storage device for host system 4. In some examples, storage devices 6 may be configured to operate as separate disks that each independently store data for host system 4 (e.g., in "just a bunch of disks" or JBOD configuration).

In operation, the amount of power that a storage device of storage devices 6 may consume may be governed by one or more factors such as the total amount of power available to the storage device (i.e., from a power supply), a power consumption target that indicates the amount of power that the storage device may consume, or the like. In some examples, the power consumption target may be set lower than the total amount of power available to the storage device. For instance, if the total amount of power available to the storage device is 25 watts (W), the power consumption target may be set at 20 W.

As discussed above, the power consumption of storage devices 6 may be influenced by a wide variety of factors and may change over time. As a result, the respective efficiencies of each storage device of storage devices 6 may not be initially uniform and/or may not uniformly change over time such that the efficiency of a particular storage device of storage devices 6 may be different from the efficiencies of the other storage devices of storage devices 6. For example, at a given time, storage device 6A may be able to perform 25 k IOPS/W, storage device 6B may be able to perform 20 k IOPS/W, storage device 6C may be able to perform 21 k IOPS/W, and storage device 6D may be able to perform 20 k IOPS/W. In situations where storage devices 6 are operating in a RAID configuration, the increased efficiency of storage device 6A may cause the RAID to become unsynchronized, which may be undesirable. Alternatively, in situations where host system 4 may separately route traffic amongst storage devices 6, the increased efficiency of storage device 6A may present a missed opportunity to increase the overall throughput of storage environment 2, which may be undesirable.

In accordance with one or more techniques of this disclosure, a device may adjust a power consumption level of a particular storage device of storage devices 6 based on power and performance data for storage devices 6. For instance, host system 4 may obtain power and performance data for each storage device of storage devices 6. As one example, host system 4 may issue a command to each of storage devices 6 to request the power and performance data. In some examples, the command may be a vendor-unique command. In some examples, the command may be a standardized command, such as a standardized Self-Monitoring, Analysis and Reporting Technology (SMART) command.

Host system 4 may then analyze the power and performance data to determine whether or not to adjust the power consumption levels of any of storage devices 6. In some examples, such as where storage devices 6 are in a RAID configuration, host system 4 may determine whether respective performance levels of storage devices 6 are within a performance level envelope, which has lower and upper bounds determined based on an average performance level of storage devices 6. For instance, host system 4 may determine a lower performance level threshold of the performance level envelope as a percentage of the average performance level of storage devices 6 (e.g., 70%, 80%, 90%, 95%, etc.) and determine an upper performance level threshold of the performance level envelope as a percentage of the average performance level of storage devices 6 (e.g., 130%, 120%, 110%, 105%, etc.). In some examples, if the respective performance level of a particular storage device of storage devices 6 is greater than the upper performance level threshold, host system 4 may determine to reduce the power consumption level of the particular storage device. In some examples, if the respective performance level of a particular storage device of storage devices 6 is less than the lower performance level threshold, host system 4 may determine to increase the power consumption level of the particular storage device. In this way, host system 4 may cause the performance level of the particular storage device to be within the performance level envelope, which may improve the stability of storage environment 2.

In some examples, such as where host system 4 may allocate traffic separately storage devices 6, host system 4 may determine a respective performance to power ratio for each respective storage device of storage devices 6. For instance, host system 4 may determine a respective IOPS/W value for each of storage devices 6. Host system 4 may determine whether the respective storage device of storage device 6 with the greatest performance to power ratio has a power consumption target that is less than a total amount of power available to the storage device. If the power consumption target of the respective storage device of storage device 6 with the greatest performance to power ratio is less than a total amount of power available to the storage device, host system 4 may determine to increase the power consumption level of the particular storage device and to increase a workload of the particular storage device (i.e., to direct more traffic to the particular storage device). In this way, host system 4 may efficiently increase the overall throughput of storage environment 2 relative to the total amount of power consumed (i.e., by increasing the total workload able to be handled by storage devices 6).

Based on the determinations, host system 4 may adjust the power consumption level of the particular storage device of storage devices 6. As one example, host system 4 may issue a command that instructs the particular storage device of storage devices 6 to adjust a power consumption target of the particular storage device. For instance, in response to determining to increase the power consumption level of a particular storage device, host system 4 may issue a command that instructs the particular storage device of storage devices 6 to increase the power consumption target of the particular storage device. As another example, host system 4 may issue a command that instructs the particular storage device of storage devices 6 to adjust an operations per time limit (e.g., an IOPS limit) of the particular storage device. For instance, in response to determining to increase the power consumption level of a particular storage device, host system 4 may issue a command that instructs the particular storage device of storage devices 6 to increase the operations per time limit of the particular storage device.

While discussed above as being performed by host system 4, in some examples, the techniques of this disclosure may be performed by one or more storage device of storage devices 6. For instance, storage devices 6 may exchange power and performance data amongst themselves (e.g., using peer-to-peer communication over PCIe). In some examples, each storage device of storage devices 6 may separately compare its power and performance data with the power and performance data received from the other storage devices and determine whether to adjust its power consumption level based on the comparison. In some examples, a storage device of storage devices 6 may operate as a "master" and may adjust the power consumption level of one or more other storage devices of storage devices 6.

Figure 2:
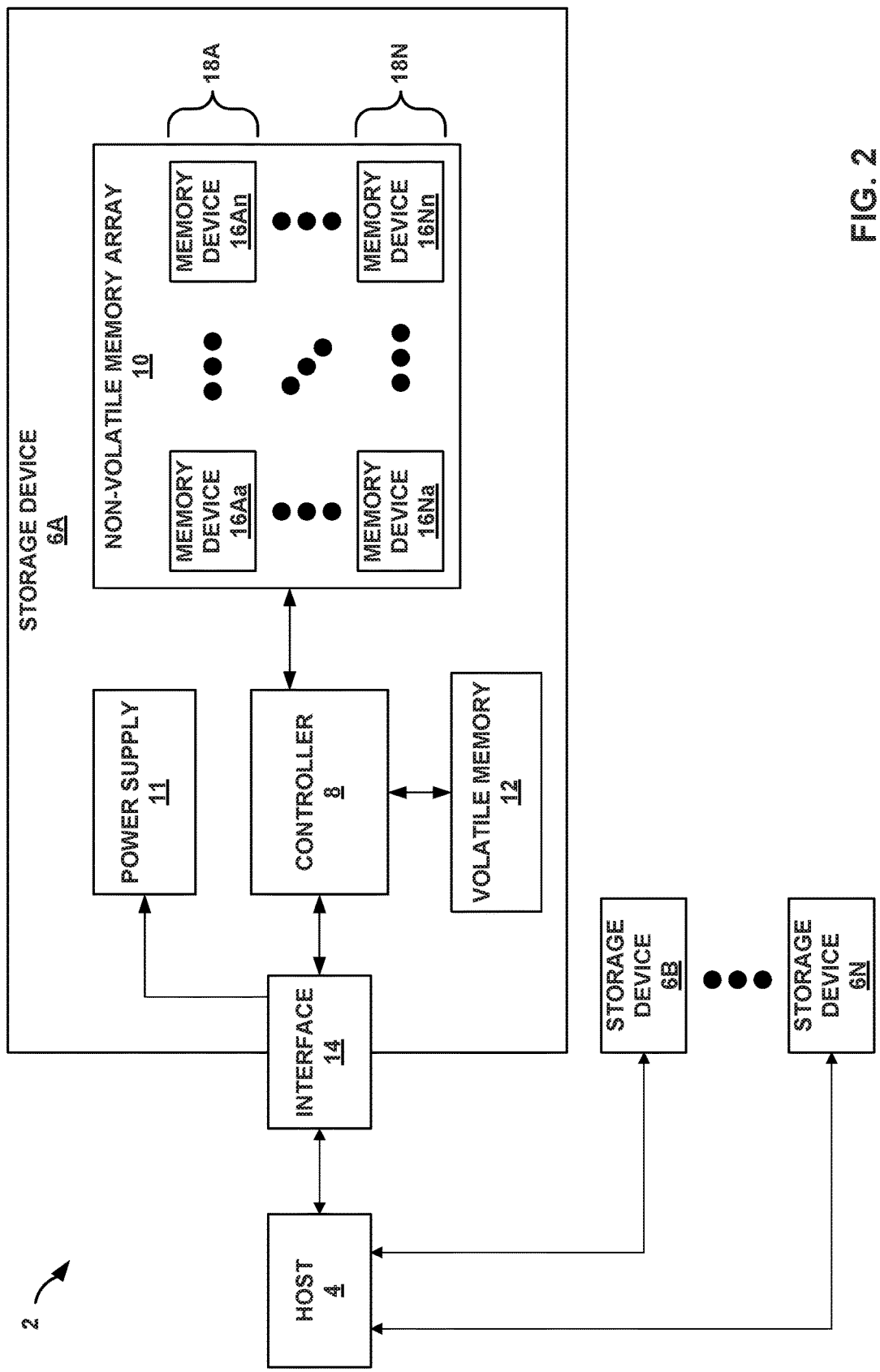
FIG. 2 is a conceptual and schematic block diagram illustrating further details of a storage device of the storage environment of FIG. 1, in accordance with one or more techniques of this disclosure.

FIG. 2 is a conceptual and schematic block diagram illustrating further details of a storage device of the storage environment of FIG. 1, in accordance with one or more techniques of this disclosure. As illustrated in FIG. 2 storage device 6A may include controller 8, non-volatile memory array 10 (NVMA 10), volatile memory 12, interface 14, and parity memory device(s) 20. In some examples, storage device 6A may include additional components not shown in FIG. 2 for sake of clarity. For example, storage device 6A may include a printed board (PB) to which components of storage device 6A are mechanically attached and which includes electrically conductive traces that electrically interconnect components of storage device 6A; and the like. In some examples, the physical dimensions and connector configurations of storage device 6A may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.), Mini-SATA, and M.2. In some examples, storage device 6A may be directly coupled (e.g., directly soldered) to a motherboard of host system 4.

Storage device 6A may include interface 14 for interfacing with host system 4. Interface 14 may include one or both of a data bus for exchanging data with host system 4 and a control bus for exchanging commands with host system 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of interface 14 (e.g., the data bus, the control bus, or both) is electrically connected to controller 8, providing electrical connection between host system 4 and controller 8, allowing data to be exchanged between host system 4 and controller 8. In some examples, the electrical connection of interface 14 may also permit storage device 6A to receive power from host system 4.

Storage device 6A may include NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6A may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks that each includes a plurality of pages. Each block may include a plurality of NAND cells. Rows of NAND cells may be serially electrically connected using a word line to define a page. Respective cells in each of the pages may be electrically connected to respective bit lines. Controller 8 may write data to and read data from NAND flash memory devices at the page level and erase data from NAND flash memory devices at the block level.

In some examples, memory devices 16 may include any type of non-volatile memory devices. Some examples, of memory devices 16 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 2, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6A may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

Storage device 6A may include power supply 11, which may provide power to one or more components of storage device 6A. When operating in a standard mode, power supply 11 may provide power to the one or more components using power provided by an external device, such as host system 4. For instance, power supply 11 may provide power to the one or more components using power received from host system 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6A also may include volatile memory 12, which may be used by controller 8 to store information. In some examples, controller 8 may use volatile memory 12 as a cache. For instance, controller 8 may store cached information 13 in volatile memory 12 until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 6A includes controller 8, which may manage one or more operations of storage device 6A. For instance, controller 8 may manage the reading of data from and/or the writing of data to memory devices 16. In some examples, controller 8 may perform one or more operations to manage data stored by memory devices 16. For instance, controller 8 may perform one or more operations to ensure the integrity of data stored by memory devices 16, such as storing parity data for user data stored by memory devices 16. Additional details of controller 8 are discussed below with reference to FIG. 3.

Figure 3:
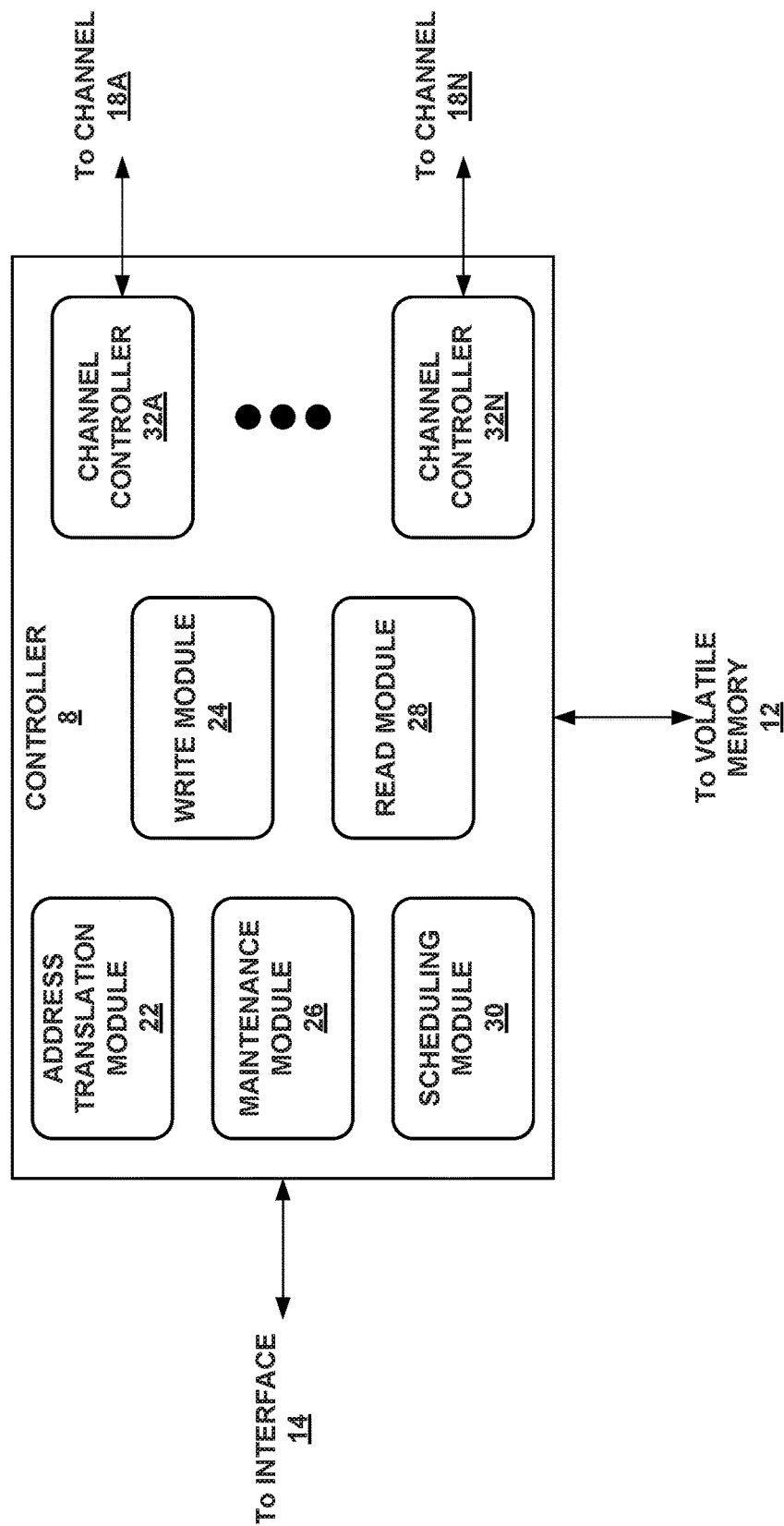
FIG. 3 is a conceptual and schematic block diagram illustrating example details of a controller, in accordance with one or more techniques of this disclosure.

FIG. 3 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 28"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host system 4 via interface 14 and manage the storage of data to and the retrieval of data from memory devices 16. For example, write module 24 of controller 8 may manage writes to memory devices 16. For example, write module 24 may receive a message from host system 4 via interface 14 instructing storage device 6 to store data associated with a logical address and the data. Write module 24 may manage writing of the data to memory devices 16.

For example, write module 24 may communicate with address translation module 22, which manages translation between logical addresses used by host system 4 to manage storage locations of data and physical block addresses used by write module 24 to direct writing of data to memory devices. Address translation module 22 of controller 8 may utilize a flash translation layer or indirection table that translates logical addresses (or logical block addresses) of data stored by memory devices 16 to physical block addresses of data stored by memory devices 16. For example, host system 4 may utilize the logical block addresses of the data stored by memory devices 16 in instructions or messages to storage device 6A, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13. In this way, host system 4 may be allowed to use a static logical block address for a certain set of data, while the physical block address at which the data is actually stored may change.

Responsive to receiving a write command from host system 4, write module 24 may determine at which physical locations (e.g., blocks) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host system 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection (block reclamation).

Scheduling module 30 of controller 8 may perform one or more operations to schedule activities to be performed by memory devices 16. For instance, scheduling module 30 may schedule requests received from other components of controller 8 to command one or more of memory devices 16 to perform one or more activities during run-time. In some examples, scheduling module 30 may schedule the requests to be performed in the order in which they were received (e.g., first-in first-out or FIFO). In some examples, scheduling module 30 may schedule the requests based one or more factors which may include, but are not limited to, the type of request (e.g., a read request, a write request, an erase request, a garbage collection request, etc.), an amount of time elapsed since the request was received, an amount of power that would be consumed by performance of the request, bandwidth considerations, and the like.

In some examples, such as to comply with a power consumption budget, scheduling module 30 may schedule activities to be performed such that performance is throttled. For instance, where the power consumption budget allocates an amount of power to memory devices 16 that is less than an amount of power that would be consumed if all of memory devices 16 were concurrently active, scheduling module 30 may schedule activities to be performed such that the amount of power consumed by memory devices 16 does not exceed to amount of power allocated to memory devices 16.

As one example, where storage device 6A has a power consumption target of 25 W, the power consumption budget may allocate a portion of the power consumption target (e.g., 16 W) for use by memory devices 16. If the amount of power that would be consumed if all of memory devices 16 were concurrently active is greater than the allocated portion of the power consumption target (e.g., 16 W), scheduling module 30 may determine a quantity of memory devices 16 that may be currently active without consuming more power than the allocated portion. For instance, where memory devices 16 are allocated X units of a power consumption budget and each memory device of memory devices 16 consumed one unit of power when active, scheduling module 30 may determine that X memory devices of memory devices 16 may be concurrently active.

In some examples, the power consumption target of storage device 6A may be adjustable. For instance, as discussed above and in accordance with one or more techniques of this disclosure, the power consumption target of storage device 6A may be adjusted based on based on the power and performance data for storage devices 6.

Figure 4:
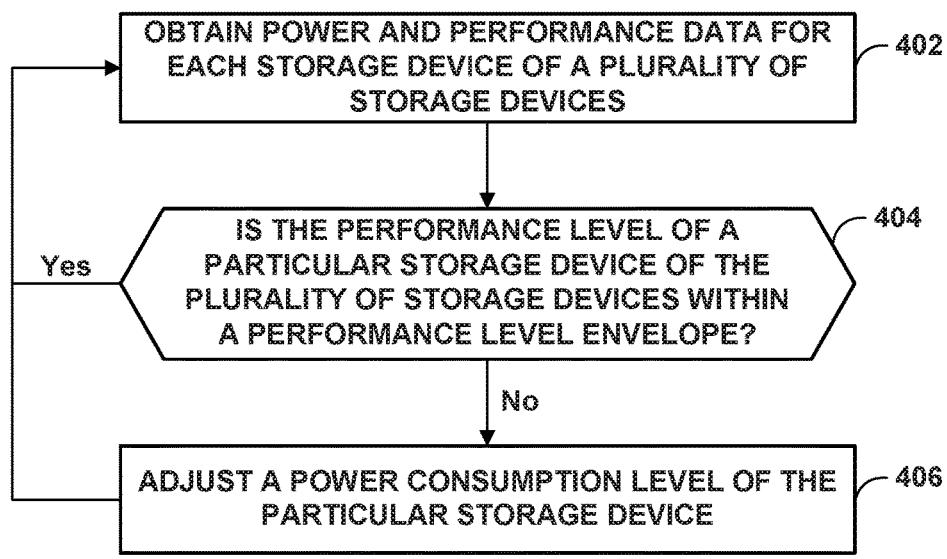
FIG. 4 is a flow diagram illustrating an example technique for adjusting power consumption levels of a particular storage device based on power and performance data of a plurality of storage devices, in accordance with one or more techniques of this disclosure.

FIG. 4 is a flow diagram illustrating an example technique for adjusting power consumption levels of a particular storage device based on power and performance data of a plurality of storage devices, in accordance with one or more techniques of this disclosure. The technique of FIG. 4 will be described with reference to host system 4 of FIGS. 1 and 2 for ease of description, although computing devices having configurations different than that of host system 4 may perform the techniques of FIG. 4 (e.g., one or more of storage devices 6 or controller 8 of FIGS. 1-3 may perform the techniques of FIG. 4). In some examples, the technique of FIG. 4 may apply when the storage devices are in a redundant array of independent disks (RAID) configuration.

As shown in FIG. 4, host system 4 may obtain power and performance data for each storage device of a plurality of storage devices (402). For instance, one or more processors of host system 4 may issue a command to each of storage devices 6 of FIGS. 1 and 2 that causes each respective storage device of storage devices 6 to output, to host system 4, respective data indicating a number of operations that the respective storage device may perform (e.g., IOPS) and an amount of power being consumed by the respective storage device (e.g., watts).

Host system 4 may determine whether the performance level of a particular storage device of the plurality of storage devices is within a performance level envelope (404). For instance, one or more processors of host system 4 may determine an average performance level of storage devices 6 based on the power and performance data obtained for storage devices 6. The one or more processors of host system 4 may also determine a lower performance level threshold of the performance level envelope as a percentage of the average performance level of storage devices 6 (e.g., 70%, 80%, 90%, 95%, etc.) and determine an upper performance level threshold of the performance level envelope as a percentage of the average performance level of storage devices 6 (e.g., 130%, 120%, 110%, 105%, etc.). If the performance level of the particular storage device is less than the lower performance level threshold or greater than the upper performance level threshold, the one or more processors of host system 4 may determine that the performance level of the particular storage device is not within the performance level envelope. Similarly, if the performance level of the particular storage device is greater than the lower performance level threshold and less than the upper performance level threshold, the one or more processors of host system 4 may determine that the performance level of the particular storage device is within the performance level envelope.

Where the performance level of the particular storage device is not within the performance level envelope ("No" branch of 404), host system 4 may adjust a power consumption level of the particular storage device (406). As one example, where the performance level of the particular storage device is less than the lower performance level threshold, the one or more processors of host system 4 may increase the power consumption level of the particular storage device. For instance, the one or more processors may output a command that causes the particular storage device to increase its power consumption target. As another example, where the performance level of the particular storage device is greater than the upper performance level threshold, the one or more processors of host system 4 may decrease the power consumption level of the particular storage device. For instance, the one or more processors may output a command that causes the particular storage device to decrease its power consumption target.

In some examples, after adjusting the power consumption level of the particular storage device or where the performance level of the particular storage device is within the performance level envelope ("Yes" branch of 404), host system 4 may continue to periodically obtain power and performance data for each storage device of a plurality of storage devices (402). In this way, host system 4 may improve the stability of the storage environment (i.e., by improving the synchronization of the plurality of storage devices).

Figure 5:
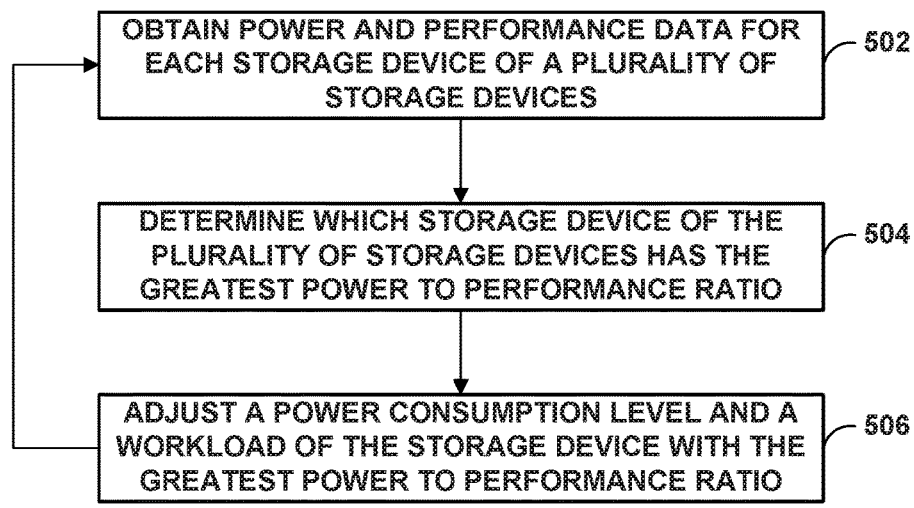
FIG. 5 is a flow diagram illustrating an example technique for adjusting power consumption levels of a particular storage device based on power and performance data of a plurality of storage devices, in accordance with one or more techniques of this disclosure.

FIG. 5 is a flow diagram illustrating an example technique for adjusting power consumption levels of a particular storage device based on power and performance data of a plurality of storage devices, in accordance with one or more techniques of this disclosure. The technique of FIG. 5 will be described with reference to host system 4 of FIGS. 1 and 2 for ease of description, although computing devices having configurations different than that of host system 4 may perform the techniques of FIG. 5 (e.g., one or more of storage devices 6 or controller 8 of FIGS. 1-3 may perform the techniques of FIG. 5).

As shown in FIG. 5, host system 4 may obtain power and performance data for each storage device of a plurality of storage devices (502). For instance, one or more processors of host system 4 may issue a command to each of storage devices 6 of FIGS. 1 and 2 that causes each respective storage device of storage devices 6 to output, to host system 4, respective data indicating a number of operations that the respective storage device may perform (e.g., IOPS) and an amount of power being consumed by the respective storage device (e.g., watts).

Host system 4 may determine which storage device of the plurality of storage devices has the greatest power to performance ratio (504). For instance, one or more processors of host system 4 may determine, based on the power and performance data for the plurality of storage devices, a respective performance to power ratio for each respective storage device (e.g., IOPS/W).

Host system 4 may adjust a power consumption level and a workload of the storage device with the greatest power to performance ratio (506). For instance, one or more processors of host system 4 may determine whether a power consumption target of the storage device with the greatest power to performance ratio is less than a total amount of power available to the storage device with the greatest power to performance ratio. If the power consumption target of the storage device with the greatest power to performance ratio is less than the total amount of power available to the storage device with the greatest power to performance ratio (e.g., the power consumption target is 20 W and the total amount of power available is 25 W), the one or more processors of host system 4 may increase the power consumption level and a workload of the storage device with the greatest power to performance ratio.

In some examples, after adjusting the power consumption level and workload of the storage device with the greatest power to performance ratio, host system 4 may continue to periodically obtain power and performance data for each storage device of a plurality of storage devices (502). In this way, host system 4 may increase the overall throughput of the storage environment (i.e., by increasing the total workload able to be handled by the plurality of storage devices).

The following numbered examples may illustrate one or more aspects of the disclosure:

EXAMPLE 1

A method comprising: obtaining power and performance data for each storage device of a plurality of storage devices; and adjusting, based on the power and performance data for the plurality of storage devices, a power consumption level of a particular storage device of the plurality of storage devices.

EXAMPLE 2

The method of example 1, wherein the plurality of storage devices are in a redundant array of independent disks (RAID) configuration, the method further comprising: determining, based on the power and performance data for the plurality of storage devices, whether respective performance levels of the plurality of storage devices are within a performance level envelope, wherein adjusting the power consumption level of the particular storage device comprises adjusting the power consumption level of the particular storage device in response to determining that the respective performance level of the particular storage device is not within the performance level envelope.

EXAMPLE 3

The method of any combination of examples 1-2, wherein the performance level envelope includes a lower performance level threshold and an upper performance level threshold, wherein adjusting the power consumption level of the particular storage device in response to determining that the respective performance level of the particular storage device is not within the performance level envelope comprises: reducing the power consumption level of the particular storage device in response to determining that the respective performance level of the particular storage device is greater than the upper performance level threshold.

EXAMPLE 4

The method of any combination of examples 1-3, wherein adjusting the power consumption level of the particular storage device in response to determining that the respective performance level of the particular storage device is not within the performance level envelope further comprises: increasing the power consumption level of the particular storage device in response to determining that the respective performance level of the particular storage device is less than the lower performance level threshold.

EXAMPLE 5

The method of any combination of examples 1-4, further comprising: determining, based on the power and performance data for the plurality of storage devices, an average performance level of the plurality of storage devices; and determining the performance level envelope based on the average performance level of the plurality of storage devices.

EXAMPLE 6

The method of example 1, further comprising: determining, based on the power and performance data for the plurality of storage devices, a respective performance to power ratio for each respective storage device, wherein adjusting the power consumption level of the particular storage device comprises: in response to determining that the particular storage device has the greatest respective performance to power ratio of the plurality of storage devices and that a power consumption target of the particular storage device is less than a total amount of power available to the particular storage device: increasing the power consumption level of the particular storage device; and increasing a workload of the particular storage device.

EXAMPLE 7

The method of any combination of examples 1-6, wherein the power and performance data for each storage device of the plurality of storage devices is obtained by a host system of the plurality of storage devices, and wherein the host system adjusts the power consumption level of the particular storage device.

EXAMPLE 8

The method of any combination of examples 1-7, wherein adjusting the power consumption level of the particular storage device comprises: adjusting a power consumption target of the particular storage device.

EXAMPLE 9

The method of any combination of examples 1-8, wherein adjusting the power consumption level of the particular storage device comprises: adjusting an operations per time limit of the particular storage device.

EXAMPLE 10

The method of any combination of examples 1-9, wherein the power and performance data for each storage device of the plurality of storage devices is obtained by a storage device of the plurality of storage devices using peer-to-peer communication, and wherein the storage device adjusts the power consumption level of the particular storage device.

EXAMPLE 11

A host system comprising: one or more processors configured to: obtain power and performance data for each storage device of a plurality of storage devices controlled by the host system; and adjust, based on the power and performance data for the plurality of storage devices, a power consumption level of a particular storage device of the plurality of storage devices.

EXAMPLE 12

The host system of example 11, wherein the one or more processors are configured to perform the method of any combination of examples 1-10.

EXAMPLE 13

A host system comprising means for performing the method of any combination of examples 1-10.

EXAMPLE 14

A computer-readable storage medium storing instructions that, when executed, cause one or more processors of a host system to perform the method of any combination of examples 1-10.

EXAMPLE 15

A storage device comprising: a controller configured to: obtain power and performance data for each storage device of a plurality of storage devices that includes the storage device; and adjust, based on the power and performance data for the plurality of storage devices, a power consumption level of a particular storage device of the plurality of storage devices.

EXAMPLE 16

The storage device of example 15, wherein the particular storage device is the storage device.

EXAMPLE 17

The storage device of example 15, wherein the particular storage device is a different storage device of the plurality of storage devices.

EXAMPLE 18

The storage device of example 15, wherein the one or more processors are configured to perform the method of any combination of examples 1-10.

EXAMPLE 19

A storage device comprising means for performing the method of any combination of examples 1-10, 16, and 17.

EXAMPLE 20

A computer-readable storage medium storing instructions that, when executed, cause a controller of a storage device to perform the method of any combination of examples 1-10, 16, and 17.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
obtaining power and performance data including input/output operations per second for each storage device of a plurality of storage devices, wherein a host system determines a respective input/output operations per second per watt value for each of the plurality of storage devices from actual operations; and
increasing, based on the input/output operations per second per watt value, a power consumption level of a particular storage device with a greatest input/output operations per second per watt value of the plurality of storage devices when the particular storage device with the greatest input/output operations per second per watt value is less than a total amount of power available to the particular storage device; and
determining, based on the input/output operations per second per watt value for the plurality of storage devices, whether respective performance levels of the plurality of storage devices are within a performance level envelope, wherein increasing the power consumption level of the particular storage device comprises adjusting the power consumption level of the particular storage device in response to determining that the respective performance level of the particular storage device is not within the performance level envelope;
determining, based on the power and performance data for the plurality of storage devices, an average performance level of the plurality of storage devices; and
determining the performance level envelope based on the average performance level of the plurality of storage devices.

2. The method of claim 1, wherein the performance level envelope includes a lower performance level threshold and an upper performance level device in response to determining that the respective performance level of the particular storage device is not within the performance level envelope comprises:
reducing the power consumption level of the particular storage device in response to determining that the respective performance level of the particular storage device is greater than the upper performance level threshold.

3. The method of claim 2, wherein adjusting the power consumption level of the particular storage device in response to determining that the respective performance level of the particular storage device is not within the performance level envelope further comprises:
increasing the power consumption level of the particular storage device in response to determining that the respective performance level of the particular storage device is less than the lower performance level threshold.

4. A method comprising:
obtaining power and performance data including input/output operations per second for each storage device of a plurality of storage devices, wherein a host system determines a respective input/output operations per second per watt value for each of the plurality of storage devices from actual operations; and
increasing, based on the input/output operations per second per watt value, a power consumption level of a particular storage device with a greatest input/output operations per second per watt value of the plurality of storage devices when the particular storage device with the greatest input/output operations per second per watt value is less than a total amount of power available to the particular storage device; and
determining, based on the input/output operations per second per watt value for the plurality of storage devices, whether respective performance levels of the plurality of storage devices are within a performance level envelope, wherein increasing the power consumption level of the particular storage device comprises adjusting the power consumption level of the particular storage device in response to determining that the respective performance level of the particular storage device is not within the performance level envelope wherein the performance level envelope includes a lower performance level threshold and an upper performance level device in response to determining that the respective performance level of the particular storage device is not within the performance level envelope comprises:

reducing the power consumption level of the particular storage device in response to determining that the respective performance level of the particular storage device is greater than the upper performance level threshold;

determining, based on the power and performance data for the plurality of storage devices, an average performance level of the plurality of storage devices; and determining the performance level envelope based on the average performance level of the plurality of storage devices.

5. The method of claim 1, further comprising:

determining, based on the power and performance data for the plurality of storage devices, the respective performance to power ratio for each respective storage device, wherein adjusting the power consumption level of the particular storage device comprises:

in response to determining that the particular storage device has the greatest respective performance to power ratio of the plurality of storage devices and that a power consumption target of the particular storage device is less than a total amount of power available to the particular storage device:

increasing the power consumption level of the particular storage device; and increasing a workload of the particular storage device.

6. The method of claim 1, wherein the power and performance data for each storage device of the plurality of storage devices is obtained by a host system of the plurality of storage devices, and wherein the host system adjusts the power consumption level of the particular storage device.

7. The method of claim 1, wherein adjusting the power consumption level of the particular storage device comprises:

adjusting a power consumption target of the particular storage device.

8. The method of claim 1, wherein adjusting the power consumption level of the particular storage device comprises:

adjusting an operations per time limit of the particular storage device.

9. The method of claim 1, wherein the power and performance data for each storage device of the plurality of storage devices is obtained by a storage device of the plurality of storage devices using peer-to-peer communication, and wherein the storage device adjusts the power consumption level of the particular storage device.

10. A host system comprising:

one or more processors configured to:

obtain power and performance data including input/output operations per second for each storage device of a plurality of storage devices controlled by the host system, wherein the power and performance data including an input/output operations per second per watt value are obtained from actual operations of the plurality of storage devices;

adjust, based on the power and performance data and the input/output operations per second per watt value for the plurality of storage devices, a power consumption level of a particular storage device of the plurality of storage devices; and determine, based on the power and performance data for the plurality of storage devices and the input/output operations per second per watt value, whether respective performance levels of the plurality of storage devices are within a performance level envelope, wherein, to adjust the power consumption level of the particular storage device, the one or more processors are configured to adjust the power consumption level of the particular storage device in response to determining that the respective performance level of the particular storage device is not within the performance level envelope determining, based on the power and performance data for the plurality of storage devices, an average performance level of the plurality of storage devices; and determining the performance level envelope based on the average performance level of the plurality of storage devices.

11. The host system of claim 10, wherein the plurality of storage devices are in a redundant array of independent disks (RAID) configuration.

12. The host system of claim 10, wherein the performance level envelope includes a lower performance level threshold and an upper performance level threshold, and wherein, to adjust the power consumption level of the particular storage device in response to determining that the respective performance level of the particular storage device is not within the performance level envelope, the one or more processors are further configured to:

reduce the power consumption level of the particular storage device in response to determining that the respective performance level of the particular storage device is greater than the upper performance level threshold.

13. The host system of claim 12, wherein, to adjust the power consumption level of the particular storage device in response to determining that the respective performance level of the particular storage device is not within the performance level envelope, the one or more processors are further configured to:

increase the power consumption level of the particular storage device in response to determining that the respective performance level of the particular storage device is less than the lower performance level threshold.

14. A host system comprising:

one or more processors configured to:

obtain power and performance data including input/output operations per second for each storage device of a plurality of storage devices controlled by the host system, wherein the power and performance data including an input/output operations per second per watt value are obtained from actual operations of the plurality of storage devices;

adjust, based on the power and performance data and the input/output operations per second per watt value for the plurality of storage devices, a power consumption level of a particular storage device of the plurality of storage devices; and determine, based on the power and performance data for the plurality of storage devices and the input/output operations per second per watt value, whether respective performance levels of the plurality of storage devices are within a performance level envelope, wherein, to adjust the power consumption level of the particular storage device, the one or more processors are configured to adjust the power consumption level of the particular storage device in response to determining that the respective performance level of the particular storage device is not within the performance level envelope wherein the performance level envelope includes a lower performance level threshold and an upper performance level threshold, and wherein, to adjust the power consumption level of the particular storage device in response to determining that the respective performance level of the particular storage device is not within the performance level envelope, the one or more processors are further configured to:

reduce the power consumption level of the particular storage device in response to determining that the respective performance level of the particular storage device is greater than the upper performance level threshold wherein the one or more processors are further configured to:

determine, based on the power and performance data for the plurality of storage devices, an average performance level of the plurality of storage devices; and determine the performance level envelope based on the average performance level of the plurality of storage devices.

15. The host system of claim 10, wherein the one or more processors are further configured to:

determine, based on the power and performance data for the plurality of storage devices, the respective performance to power ratio for each respective storage device, wherein adjusting the power consumption level of the particular storage device comprises:

in response to determining that the particular storage device has the greatest respective performance to power ratio of the plurality of storage devices and that a power consumption target of the particular storage device is less than a total amount of power available to the particular storage device:

increase the power consumption level of the particular storage device; and increase a workload of the particular storage device.

16. The host system of claim 10, wherein, to adjust the power consumption level of the particular storage device, the one or more processors are configured to one or both of:

adjust a power consumption target of the particular storage device; and adjust an operations per time limit of the particular storage device.

17. A storage device comprising:

a controller configured to:

obtain power and performance data including input/output operations per second for each storage device of a plurality of storage devices that includes the storage device, wherein the power and performance data includes input/output operations per second per watt value are obtained from actual operations of the plurality of storage devices; and adjust, based on the power and performance data and the input/output operations per second per watt value for the plurality of storage devices, a power consumption level of a particular storage device of the plurality of storage devices;

determining, based on the power and performance data for the plurality of storage devices, an average performance level of the plurality of storage devices; and determining a performance level envelope based on the average performance level of the plurality of storage devices.

18. The storage device of claim 17, wherein the particular storage device is the storage device.

19. The storage device of claim 17, wherein the particular storage device is a different storage device of the plurality of storage devices.

* * * * *